B. O. CUDDIGAN.
POTATO LOADER.
APPLICATION FILED FEB. 23, 1918.
1,273,040.
Patented July 16, 1918.
2 SHEETS—SHEET 1.
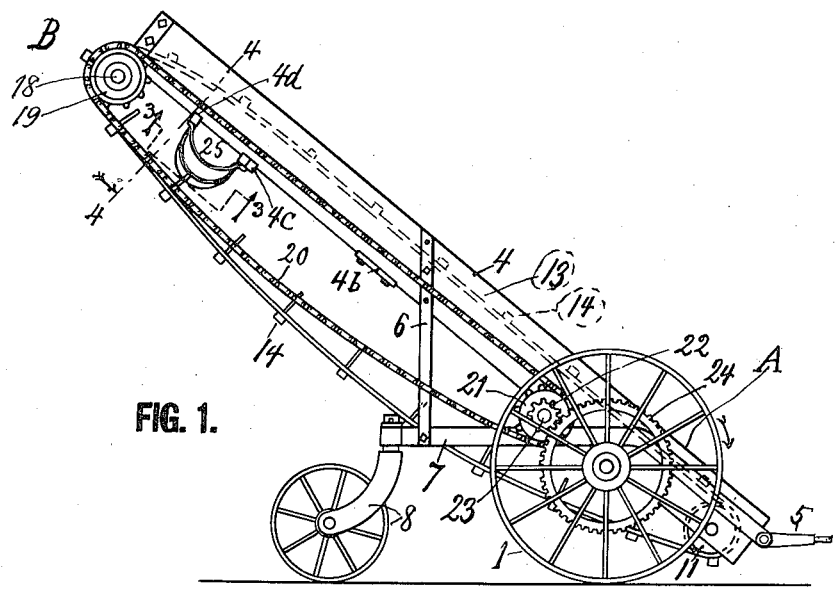
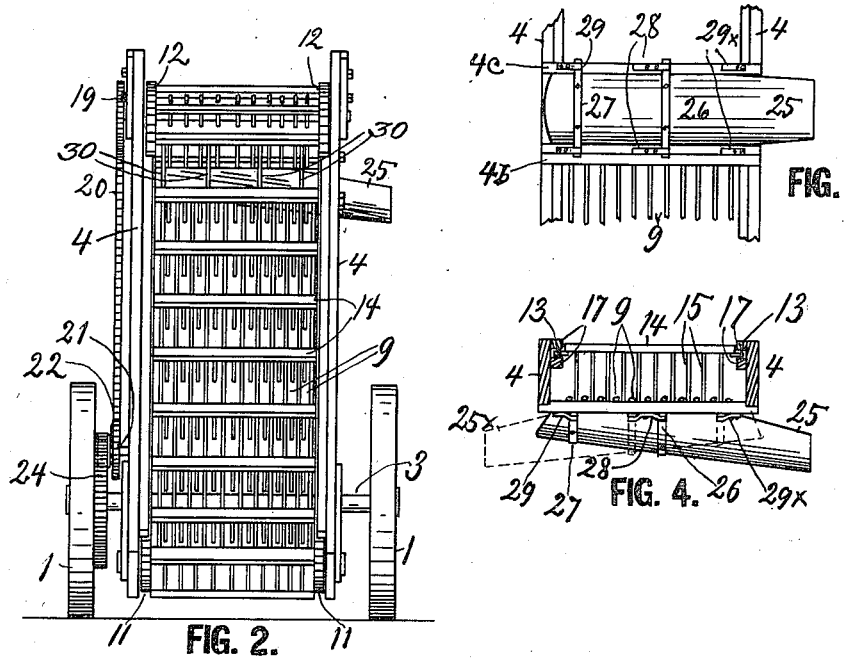
INVENTOR.
B.O. Cuddigan.
BY HIS ATTORNEY:
A.M. Carlsen.

B. O. CUDDIGAN.
POTATO LOADER.
APPLICATION FILED FEB. 23, 1918.
1,273,040.
Patented July 16, 1918.
2 SHEETS—SHEET 2.
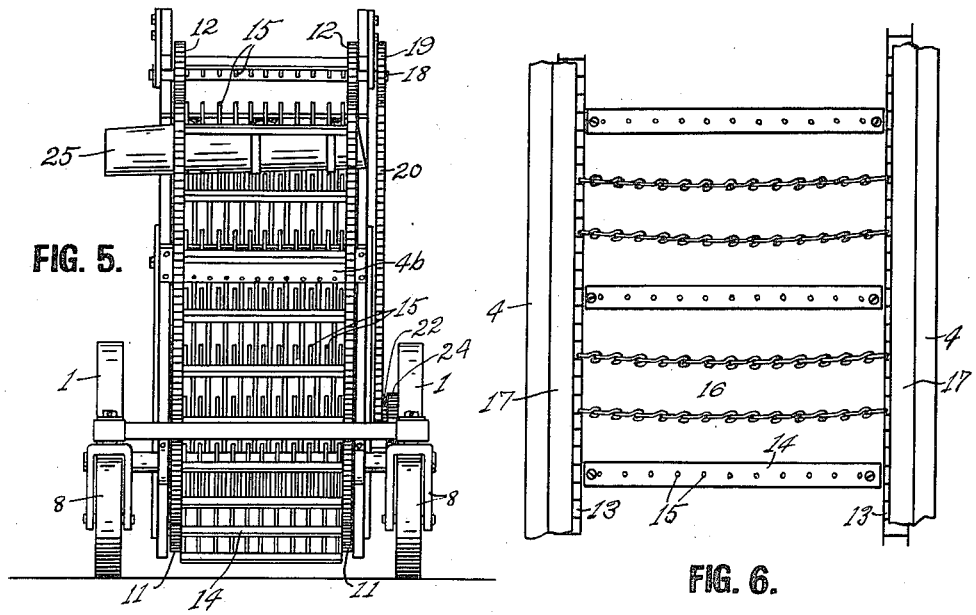
FIG. 5.
FIG. 6.
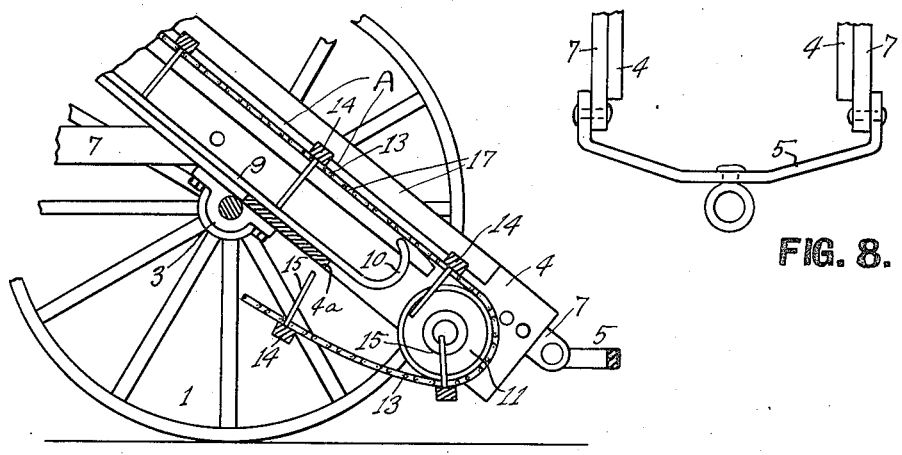
FIG. 7.
FIG. 8.
INVENTOR.
B. O. Cuddigan
BY HIS ATTORNEY:
A. M. Carlsen

UNITED STATES PATENT OFFICE.

BARTHOLOMEW O. CUDDIGAN, OF WADENA, MINNESOTA.

POTATO-LOADER.

1,273,040.  Specification of Letters Patent.  Patented July 16, 1918.

Application filed February 23, 1918. Serial No. 218,856.

*To all whom it may concern:*

Be it known that I, BARTHOLOMEW O. CUDDIGAN, a citizen of the United States, residing at Wadena, in the county of Wadena and State of Minnesota, have invented a new and useful Potato-Loader, of which the following is a specification.

This invention relates to potato loading machines, and the object is to provide an efficient device to be attached to a potato digging machine for separating the potato from the dirt and from the vines and delivering it into a wagon drawn at either side of the device.

In the accompanying drawings, Figure 1 is a side elevation of the improved potato loader. Fig. 2 is a front elevation of it. Fig. 3 is a bottom view or section on line 3—3 in Fig. 1 of a portion of the elevator showing how the final delivery chute is attached thereto. Fig. 4 is a section on the line 4—4 in Fig. 1. Fig. 5 is a rear elevation of the machine. Fig. 6 is an enlarged portion of the potato elevator. Fig. 7 is a longitudinal section of the front portion of the machine. Fig. 8 is a top view showing mainly the draft bail by which the loader is attached to the potato digger.

Referring to the drawings by reference numerals, 1, 1, designate a pair of ground wheels, supporting an axle 2, on which is mounted by means of bearings 3 an inclined skeleton elevator frame 4, whose front end is provided with a draft bail 5 adapted to be attached to the rear end of any ordinary potato digging machine of the kind drawn by horses or other power and delivering potatoes from its rear end some distance above the ground.

Said inclined frame is supported in its inclined position by braces 6 from a horizontal frame extension 7, the rear end of which is provided with casters 8, which support it in such a manner that the entire machine may be turned from side to side on the wheels and the casters.

The inclined frame is composed of side boards 4 and transverse bars $4^a$, $4^b$, $4^c$ (see Figs. 7, 5, 3 and 1, respectively). Upon said bars are secured a series of longitudinal iron bars 9 forming a skeletoned bottom. Said bars may be about one and one-fourth inches apart so as not to allow any potatoes of a size worth saving to pass between them. The lower ends 10 of the bars are curved upward (see 10 in Fig. 7) so no potatoes can escape downward.

Mounted on suitable wheels 11 and 12 in the lower and upper end of the inclined frame is an endless skeleton elevator apron 13 having cleats 14 carrying inward fingers 15. In Fig. 6 is shown how the spaces between the cleats 14 are traversed by chains 16 to help carry the vines as will presently be more fully described. The chains 13 of the elevator are partly guided between longitudinal strips 17 of the frame 4.

The wheels or sprockets 12 are fixed on a shaft 18, at one end of which is fixed a sprocket 19, driven by a link belt 20, the latter being driven by a sprocket 21, fixed to a gear pinion 22, which with the sprocket rotates on a stud 23 and is driven by a gear wheel 24 fixed on one of the ground wheels 1.

25 is a chute held transversely below the elevator frame, near beyond the upper end of the skeleton floor 9. The chute is changeable so as to incline toward and beyond either side of the elevator, alternately in the two positions 25 and $25^x$ in Fig. 4. It is to that end provided with hangers 26, 27, detachably held in keepers 28 fixed on the bars $4^c$ and $4^d$. In reversing the chute the longer hanger 26 is placed at the other ends of the keepers 28 and the hanger 27 is removed from one and inserted in the other of the two keepers 29 and $29^x$. 30 are special fixed bars to guide the vines across the chute.

In the operation of the machine the bale 5 is attached to the rear of a potato digger and as the digger advances it delivers potato vines and dirt at A upon the front portion of the elevator 13, 14, and while this elevator carries the vines over to B and lets them drop on the ground the potato and the dirt drop through the upper run of the elevator and drop upon the skeleton bottom 9, where the fingers 15 move along and constantly stir the dirt down through the bottom while moving the potato along into the chute 25, and the latter deliver it into a wagon (not shown) driven along side of the loader.

What I claim is:—

1. In a potato loading machine, a suitably supported inclined elevator frame mounted on ground wheels, a series of longitudinally arranged parallel bars extending from the lower end to the upper end of the frame, fixed upward fingers at the lower ends of the parallel bars, an endless skeleton carrier apron arranged in the elevator frame with one run above and the other below the series of parallel bars and operative connection between the apron and the ground wheels, fingers secured to said carrier apron and arranged to pass between the fixed fingers and move upward along the upper side of the parallel bars, and a laterally inclined chute arranged to convey the potatoes from the upper end of the frame.

2. In a potato loading machine having a rearwardly inclined wheel supported elevator frame, a skeleton bottom mounted within the frame and means for elevating potatoes upwardly along said bottom to a delivery chute near the top of the frame, fixed fingers arranged near the lower end of the skeleton bottom adapted to prevent the downward escape of potatoes.

3. A potato loading machine comprising a rearwardly inclined wheel supported elevator frame, a transversely arranged potato chute mounted under the rear end of the frame, a series of longitudinal parallel bars extending from near the front end of the frame to the potato chute and means for elevating potatoes upwardly along the parallel bars to said potato chute, special bars bridging the chute to prevent objects other than potatoes from dropping thereinto.

In testimony whereof I affix my signature.

BARTHOLOMEW O. CUDDIGAN.